United States Patent [19]

Zeile et al.

[11] Patent Number: 4,670,731
[45] Date of Patent: Jun. 2, 1987

[54] SEMICONDUCTOR TEMPERATURE SENSOR

[75] Inventors: Heinrich Zeile, Hamburg; Hartmut Witt, Seevetal, both of Fed. Rep. of Germany

[73] Assignee: U.S. Philips Corporation, New York, N.Y.

[21] Appl. No.: 766,178

[22] Filed: Aug. 16, 1985

[30] Foreign Application Priority Data

Aug. 30, 1984 [DE] Fed. Rep. of Germany ....... 3431811

[51] Int. Cl.[4] .............................................. H01C 7/10
[52] U.S. Cl. .............................................. 338/225 D
[58] Field of Search ................... 338/225 D, 22 R, 23, 338/24, 25, 7; 357/69, 28, 71, 74; 374/147, 178

[56] References Cited

U.S. PATENT DOCUMENTS 3,881,181 4/1975 Khajezadeh ............... 338/225 D X
3,936,789 2/1976 Matzen et al. .................. 338/225 D
4,463,336 7/1984 Black et al. ............................. 338/4

Primary Examiner—E. A. Goldberg
Assistant Examiner—Marvin M. Lateef
Attorney, Agent, or Firm—Robert T. Mayer; Steven R. Biren

[57] ABSTRACT

A temperature sensor in the form of a temperature-dependent semiconductor resistor operating according to the current-spreading principle includes a semiconductor body of one conductivity type of silicon, which is provided on its lower side with a conductive layer and is provided on its upper side with at least one contact zone of the one conductivity type. The upper side is coated with a silicon oxide layer or a silicon nitride layer. In order for the given resistance value to be maintained more accurately and the temperature coefficient to have only a small spread, the semiconductor body is provided at its surface adjacent the silicon oxide layer or silicon nitride layer with a surface zone of the opposite conductivity type. Thus, it is possible to limit to a minimum value or to completely compensate for the influence of charges at the silicon oxide layer or silicon nitride layer.

4 Claims, 2 Drawing Figures

4,670,731

SEMICONDUCTOR TEMPERATURE SENSOR

THE INVENTION

The invention relates to a temperature sensor in the form of a temperature-dependent semiconductor resistor operating according to the current-spreading principle and comprising a semiconductor body of the one conductivity type of silicon, which is provided on its lower side with a good conducting layer and is provided on its upper side coated with a layer of silicon oxide or silicon nitride with at least one contact zone of the one conductivity type.

A semiconductor temperature sensor of this kind is known, for example, from "Electronic Components and Applications", Vol. 5 (September 1983), No. 4, pages 206 and 207.

In general, the requirement is imposed on temperature sensors that their resistance varies to the smallest possible extent during their life at a given temperature so that they age only slightly.

It is further desirable that only a small spread in the temperature coefficients of the individual sensors occurs.

In the known semiconductor temperature sensors, the said properties (ageing and spread in the temperature coefficient) are not always satisfactory.

SUMMARY OF THE INVENTION

Therefore, the invention has for its object to construct a temperature sensor of the kind mentioned above in such a manner that the given resistance value is maintained more accurately and the temperature coefficient has only a small spread.

According to the invention, this object is achieved in that the semiconductor body is provided at its surface adjacent the silicon oxide layer or silicon nitride layer with a surface zone of the other, opposite conductivity type.

In a temperature sensor constructed in accordance with the invention, the resistance variation determined by ageing and the spread in temperature coefficient of the individual sensors are considerably reduced. This will be due to the fact that the silicon oxide layer or silicon nitride layer on the upper side of the semiconductor body normally carries positive charges, whose number and mobility are not reproducible. Under the influence of these charges, the semiconductor body is enriched at the surface with electrons, which influence the resistivity and also the temperature coefficient.

The influence of these inevitable charges in the oxide or nitride layer is considerably reduced by the surface zone of the other opposite conductivity type provided in accordance with the invention. It is further also achieved that the adjustment of the resistance of the sensor during manufacture is not disturbed by the said surface charges.

Subsequently, the surface zone can be formed either by diffusion in the semiconductor body or by application of an epitaxial layer.

BRIEF DESCRIPTION OF THE DRAWING

In order that the invention may be readily understood, it will now be described more fully, by way of example, with reference to the accompanying drawing, in which:

FIGS. 1 and 2 are not drawn to scale; in particular the dimensions in the direction of thickness are greatly exaggerated for the sake of clarity.

DESCRIPTION OF THE PREFERRED EMBODIMENTS

Figure 1:
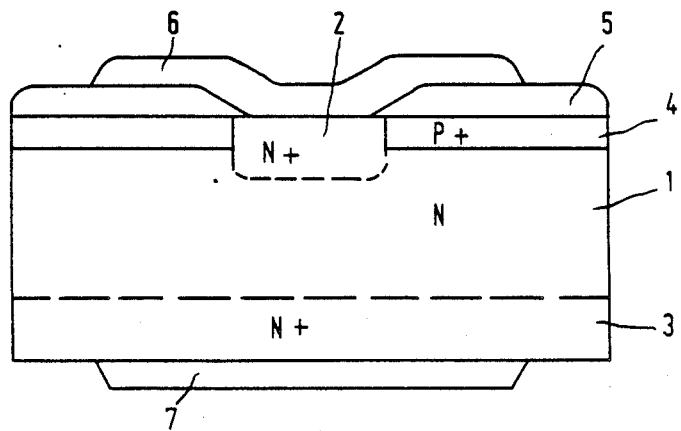
FIG. 1 is a sectional view of a one-hole temperature sensor having a surface zone produced by diffusion in the semiconductor body.

FIG. 1 is a sectional view of a temperature sensor according to the invention, which comprises a semiconductor body 1 of silicon, which is contacted on its upper side via a diffused N+-conducting contact zone 2 (in pointed form) and on its lower side with a likewise diffused N+-conducting contact zone 3 extending throughout the surface. The two contact zones 2 and 3 are provided with connection electrodes 6 and 7, respectively.

The upper side of the semiconductor body carrying the pointed contact zone 2 is coated with a silicon oxide layer 5, under which is located, however, a p-type conducting layer 4 introduced into the surface of the semiconductor body 1. The latter layer constitutes a surface zone of the opposite conductivity type and prevents the inevitable charges in the oxide layer 5 from adversely affecting the properties of the temperature sensor.

A temperature sensor thus constructed can be manufactured as follows: The starting material is a wafer of n-type conductng silicon having a resistivity of 5Ω.cm and having a thickness of 240 μm. The wafer is then thermally provided with an oxide layer having a thickness of about 0.2 μm, into which boron is then implanted throughout the surface at a dose of about 1 to $8.10^{15}$ cm$^{-2}$. Subsequently, a pyrolytic oxide is applied so that the overall thickness of the oxide layer is about 0.8 to 1 μm. Circular windows having a diameter of about 30 μm are then etched into oxide layer, whereupon phosphorus is diffused into the wafer for 100 minutes at 1100° C. so that there is formed on the upper side the n+-conducting contact zone 2 and the lower side the likewise n+-conducting contact zone 3. Both zones have a thickness of about 4 μm. Simultaneously with the diffusion of phosphorus, the implanted boron also diffuses into the upper side of the semiconductor body and thus forms the p+-conducting surface zone 4.

Subsequently, the contact electrodes 6 and 7 are applied by sputtering to both sides of the semiconductor body, these electrodes consisting, for example, of a titanium-tungsten layer having a thickness of 0.4 μm and of a gold layer having a thickness of 0.6 μm, respectively.

The semiconductor wafer is then subdivided into the individual elements and these elements are mounted in suitable housings.

Figure 2:
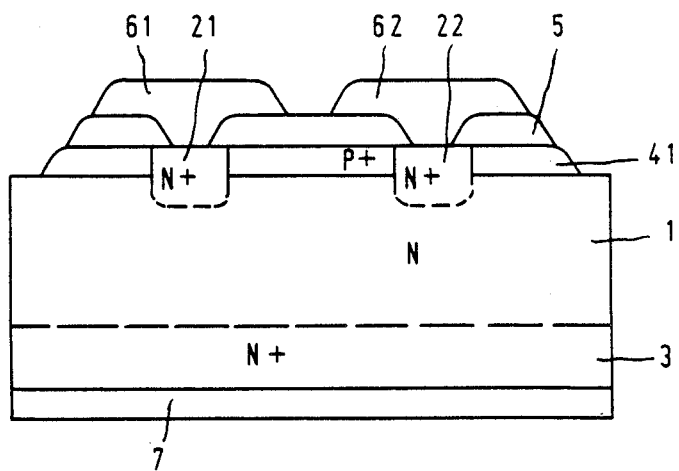
FIG. 2 is a sectional view of a two-hole temperature sensor having a surface zone in the form of an epitaxial layer.

FIG. 2 shows a sectional view of a further embodiment of a temperature sensor according to the invention, which is provided on the upper side with two contact zones 21 and 22 and in which the surface zone 41 of the opposite conductivity type is constituted by a p+-conducting epitaxial layer applied to the surface of the semiconductor body 1.

The method of manufacturing such a two-hole temperature sensor corresponds, except for the application of the surface zone 41, to the method described above with reference to FIG. 1. The epitaxial layer 41 is reduced by an etching treatment, which at the same time serves to expose the scribing lines on the semiconductor wafer, to such an extent that, after the wafer has been subdivided, an epitaxial layer of about 430×430 μm edge length is present on a semiconductor body of 500×500 μm edge length. In the same manner, the diffused surface zone 4 in the embodiment of FIG. 1 can also be removed in such a manner that it does not extend as far as the edge of the semiconductor body.

Of course an epitaxially applied layer may also be used as a surface zone in the one-hole sensor shown in FIG. 1, while a diffused surface zone may be used in the two-hole sensor shown in FIG. 2. The insulating layer on the surface of the semiconductor body may consist of silicon nitride instead of silicon oxide.

What is claimed is:

1. A temperature sensor having a temperature-dependent semiconductor resistor, which comprises:
   a silicon semiconductor body of a first conductivity type and having first and second major surfaces;
   a first semiconductor layer of said first conductivity type and having a higher doping concentration than that of said semiconductor body at a first major surface of said body;
   a second semiconductor layer of a second conductivity type opposite to said first type at a second major surface of said body;
   at least one contact zone at said second major surface, said contact zone being of said first conductivity type and having a doping concentration higher than that of said semiconductor body;
   an insulating layer over said second semiconductor layer and having an aperture at the area of each said contact zone, said second semiconductor layer having a window at the area of said aperture, the shape of said window, viewed in a direction perpendicular to said second surface, substantially corresponding to the shape of said contact zone; and
   connection electrodes for contacting said contact zone and said first semiconductor layer.

2. A temperature sensor as claimed in claim 1, characterized in that the second semiconductor layer is formed by diffusion in the semiconductor body (1).

3. A temperature sensor as claimed in claim 1, characterized in that the second semiconductor layer is formed by a layer applied epitaxially to the semiconductor body.

4. A temperature sensor as claimed in claim 2 or 3, characterized in that the second semiconductor layer does not extend as far as the edge of the semiconductor body.

* * * * *